US 9,262,382 B2

(12) United States Patent
Damera-Venkata

(10) Patent No.: US 9,262,382 B2
(45) Date of Patent: Feb. 16, 2016

(54) DETERMINATION OF WHERE TO CROP CONTENT IN A LAYOUT

(71) Applicant: Hewlett-Packard Development Company, L.P., Houston, TX (US)

(72) Inventor: Niranjan Damera-Venkata, Chennai (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 435 days.

(21) Appl. No.: 13/754,056

(22) Filed: Jan. 30, 2013

(65) Prior Publication Data

US 2014/0215321 A1    Jul. 31, 2014

(51) Int. Cl.
G06F 17/21    (2006.01)

(52) U.S. Cl.
CPC .................................. G06F 17/217 (2013.01)

(58) Field of Classification Search
CPC ..... G06F 17/211; G06F 17/212; G06F 17/24; G06F 17/248; G06F 17/217
See application file for complete search history.

(56) References Cited

U.S. PATENT DOCUMENTS

| 8,020,111 | B2 | 9/2011 | Horvitz et al. | |
| 2006/0026507 | A1* | 2/2006 | Balinsky et al. | 715/517 |
| 2007/0094251 | A1 | 4/2007 | Lu et al. | |

FOREIGN PATENT DOCUMENTS

| WO | WO 2011053282 A1 * | 5/2011 |
| WO | WO2012057805 | 5/2012 |

OTHER PUBLICATIONS

Damera-Venkata et al., Probabilistic Document Model for Automated Document Composition, Sep. 19, 2011, ACM, DocEng'11, p. 3-12.*

Hurst, N. et al., Review of Automatic Document Formatting, (Research Paper), Proceedings of the 9th symposium on Document engineering Sep. 16-18, 2009, pp. 99-108, http://www.wilmotli.com/pubs/hurst09adf.pdf.

Kowalkiewicz, M. et al., Towards More Personalized Web:Extraction and Integration of Dynamic Content From the Web, (Research Paper), 2006, pp. 668-679; vol. 3841, http://www.springerlink.com/content/f758021001455777/.

Lin, X. et al., Active Document Versioning: From Layout Understanding to Adjustment, (Research Paper), Jan. 18, 2006, 20 pps. http://spiedigitallibrary.org/proceedings/resource/2/psisdg/6067/1/60670E_1?isAuthorized=no.

* cited by examiner

*Primary Examiner* — Scott Baderman
*Assistant Examiner* — Seung Jung
(74) *Attorney, Agent, or Firm* — HP Inc. Patent Department

(57) ABSTRACT

Examples disclose an apparatus comprising a processor to determine probabilities based on both a variable range of pages in a layout and a variable range of length of content in the layout. Additionally, the examples disclose the processor is further to identify a maximum probability from the determined probabilities. Also, the examples disclose the processor is further to identify values for a number of pages and a length of content associated with the maximum probability for determination of where to crop content in the layout.

12 Claims, 5 Drawing Sheets

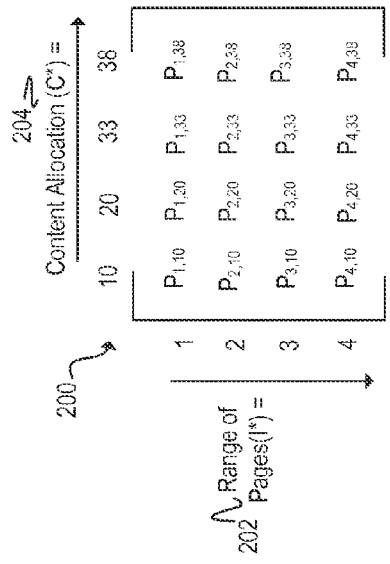
FIG. 2A
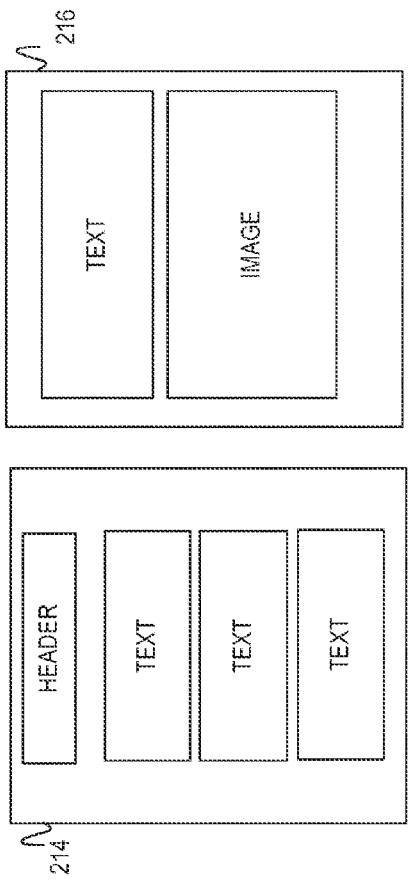
FIG. 2B
FIG. 2C
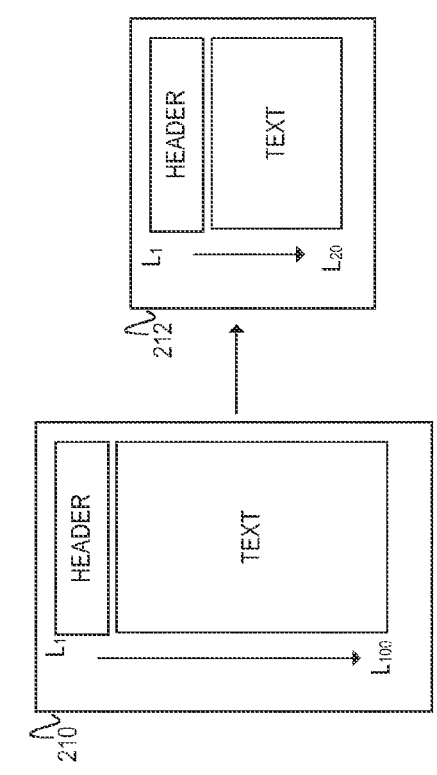
FIG. 2D

DETERMINATION OF WHERE TO CROP CONTENT IN A LAYOUT

BACKGROUND

Automated publishing may include composing a document based on content. The document may be customized to a particular user to increase the aesthetic appeal. Content, including highly personalized content, may be formatted into these documents.

BRIEF DESCRIPTION OF THE DRAWINGS

In the accompanying drawings, like numerals refer to like components or blocks. The following detailed description references the drawings, wherein:

FIG. 2A is a diagram of an example matrix including a variable range of pages and variable content allocations as columns to obtain probabilities;

FIG. 2B is a diagram of an example Gaussian curve with a maximum probability as a peak;

FIG. 2C are block diagrams of an example piece of given content and cropping the piece of given content;

FIG. 2D are block diagrams of example template layouts to illustrate pagination, arrangement of content, and/or proportion of the content;

DETAILED DESCRIPTION

In automated layout publishing, a designer may determine aesthetic decisions of how to present a given piece of content to a user. These aesthetic design choices including the arrangement, proportion, and pagination of the given piece of content. However, despite the best aesthetic design choices, the layout may be still non-aesthetically pleasing. For example this may occur when the designer is forced to work with a fixed page count and the content to be laid out exceeds the space available. In one solution, the content may be clipped at an arbitrary point which may be confusing in context and/or also non-aesthetically pleasing. Further, the content may be limited by pages and/or paragraphs, thus adding to the confusion of the context of the content. Overall, these solutions result in a diminished quality layout of the document.

To address these issues, examples disclosed herein provide a method to determine a clip point to crop content tier optimization of a layout. Content, as described herein, is information that refers to images and words that conveys semantic information, such as an article. The method calculates probabilities based on a variable range of pages in the layout and a variable length of content. Calculating the probabilities on variable page range and variable content length enables the various combinations of page ranges and content length to generate a highly optimized layout.

Additionally, the method identifies a maximum probability from the calculated probabilities. Identifying the maximum probability, values for a particular number of pages and a particular length of content may be determined thus enabling the cropping of the content in an optimal manner. The value for the particular length of content indicates the clip point of where to crop a given piece of content. The value of the particular number of pages indicates the number of pages in which to render the cropped content. This ensures the layout of the document presents an aesthetic pleasing and coherent piece of content to a user.

In another example, the variable range of length of the content is within a range of allowed content. The allowed content may be defined by a designer to further clarify the context of the content to the user. This further ensures a filtering out of clip point possibilities that result in truncations which may cause confusion and/or loses the context of the content.

In a further example, the method further crops the given piece of content at the clip point specified by the length of the content which is associated with the maximum probability. Additionally, the method renders this cropped content over the number of pages associated with the maximum probability ensuring an optimal layout to the user.

In summary, examples disclosed herein provide optimization of a layout by cropping content. Cropping the content provides a higher quality document as the context of the content is considered and/or aesthetic appearance.

Figure 1:
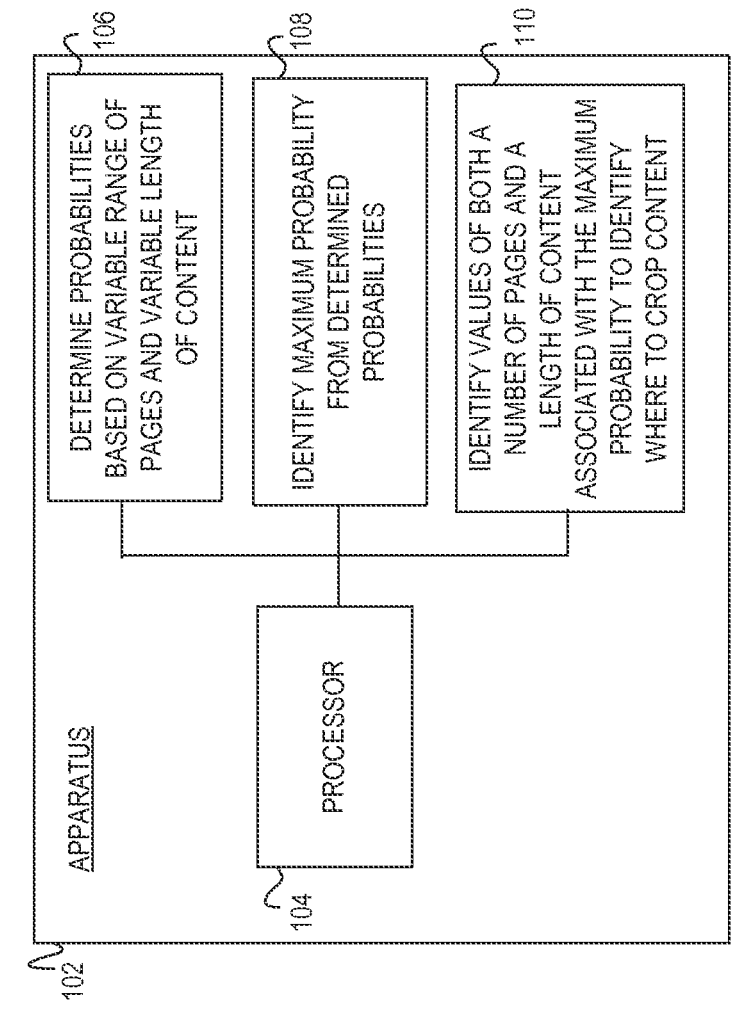
FIG. 1 is a block diagram of an example apparatus with a processor to determine probabilities, identify a maximum probability, and identify values for a number of pages and a length of content associated with the maximum probability for determination of where to crop content in a layout.

Referring now to the figures, FIG. 1 is a block diagram of an example apparatus 102 with a processor 104 to operate modules 106-110. Modules 106 and 108 determine probabilities based on both a variable range of pages and a variable length of a given piece of content in a layout for identification of the maximum probability. Module 110 uses the maximum probability identified at module 108 to identify values for a number of pages and a length of content. The number of pages and the length of content are both values within the variable ranges at module 106. Identifying the number of pages and the length of content at module 110, the processor determines where to crop content. In another embodiment, the apparatus 102 may include a display to present the cropped content to a user. In a further embodiment, the apparatus 102 is a computing device operating as a server to execute modules 106-110 for rendering a given piece of content to a user over a network. Embodiments of the apparatus 102 a client device, computing device, personal computer, desktop computer, mobile device, or other type of electronic device suitable to execute modules 106-110.

The processor 104 executes modules 106-110 to determine where to crop a piece of given content to optimize the layout. Embodiments of the processor 104 include a microchip, chipset, electronic circuit, microprocessor, semiconductor, microcontroller, central processing unit (CPU), graphics processing unit (GPU), visual processing unit (VPU), or other programmable device capable of executing modules 106, 108, and 110.

Module 106 determines probabilities based on the variable range of pages in the layout and the variable range of length of content in the layout. As described herein, probability refers to a mathematical representation of document quality. These probabilities come from probability distributions that are predefined and assigned quality scores representing the quality of a document over a number of pages with various clip points in content to optimize the layout of the document. The variable range of pages is a range of values representing the number of discrete pages in a document to present content. The variable range of length of content is a range of values representing units of content for content allocation across the corresponding number of pages. The range of values of content length may include a number of characters of text, a number of lines of text, a number of words, and/or a number paragraphs of text. The variable range of values of the content length is considered the various clipping points tier cropping the content. This enables the content to be cropped while maintaining the context of the content. For example, the last two lines in the given piece of content may usually be cropped while maintaining the context meaning of the content in a clear manner. In another embodiment, module 106 represents the probabilities as a bell-shaped curving showing a distribution of the probabilities over the values of the variable ranges of pages and/or the values of the range of length of the given piece of content. Embodiments of the module 106 include a set of instructions, instruction, process, operation, logic, algorithm, technique, logical function, firmware, and or software executable by the processor 104 to determine probabilities based on the variable range of pages and the variable length of content.

Module 108 identifies the maximum probability from the probabilities determined at module 106. In one embodiment, the maximum probability is represented as a peak on a bell-shaped curve, such as a Gaussian curve function. Embodiments of the module 108 include a set of instructions, instruction, process, operation, logic, algorithm, technique, logical function, firmware, and or software executable by the processor 104 to identify a maximum probability from the determined probabilities at module 106.

Module 110 identifies the values associated with the maximum probability. The values include the number of pages and the length of content. In one embodiment, the maximum probability is identified in a matrix. In this embodiment, the values of the number of pages and the length of content are aligned in the row and the column of where the maximum probability is identified. Further, the values of the number of pages and the length of content are considered optimal number of pages and optimal length of content as these values would determine where to crop content for optimizing the layout. Identifying these values provides the clip point to crop the given piece of content. The clip point is a point in which to crop the content while maintaining the context of the content. Embodiments of the module 110 include a set of instructions, instruction, process, operation, logic, algorithm, technique, logical function, firmware, and or software executable by the processor 104 to identify the values of the number of pages and the length of content associated with the maximum probability identified at module 108. Identifying these values enables the processor 104 to determine the clipping point to crop a given piece of content to fit a layout.

FIG. 2A is a diagram of an example matrix 200 including values of a variable range of pages 202 and a variable range of content allocation 204 to obtain probabilities P. The variable range of content allocation 204, is also referred to as the variable length of content as described in FIG. 1. The matrix 200 is a two-dimensional matrix with both the values of the variable range of pages 202 as rows and the variable range of content allocations 204 are aligned at the rows and columns to obtain probabilities P. Each of the elements P represents the probability at given page range 202 and at a given length of content 204 as indicated at each of the intersections. In another embodiment, the variable range of pages 202 and the variable content allocation 204 are each represented as a vector to obtain the probabilities P.

In a further embodiment, the matrix 200 may be represented as Equation (1). Equation (1) determines the maximum value of a probability for a set of points in a given argument. The given argument includes the variable range of pages 202 and the variable length of content 204 as in FIG. 2A.

$$\{I^*, C^*\} = \begin{array}{c} \text{argmax} \\ lmin \leq I \geq lmax \\ C \in Callowed \end{array} \quad (1)$$

$$T(I, C)$$

In Equation (1), T(I,C) represents the matrix 200 while I* represents the optimal number of pages and C* represents the optimal content allocation to these pages. This equation determines the maximum probability where Callowed is the various clip points in which the content may be cropped while still maintaining its context. In this manner, the content may be broken up into various boundaries to ensure the content is aesthetically pleasing and articulate. For example, this may be defined by paragraphs or lines which occur after at least some point in an article. Providing the possible clip points, enables a filtering out of clip point possibilities that result in truncations which may be confusing or loses the context. For example, this may include mid-sentence truncations. Further, this also enables the context of the content to be presented to the user in an articulate and clear manner.

FIG. 2B is a diagram of an example bell-curve 206 with the possible probabilities from the matrix 200 along the curve 206. The bell-curve 206 may also be referred to as a Gaussian function to model the probabilities as calculated in FIG. 2A. The maximum probability 208 is modeled as the peak on the curve 206. For example, assume the maximum probability 208 intersects on the matrix 200 at $P_{3,20}$ which indicates the optimal value of pages is three and the optimal content allocation (i.e., length of content) is 20. The length of the content indicates the content after text line, character, and/or word 20 may be cropped to optimize the layout as illustrated in FIG. 2C.

FIG. 2C illustrates block diagrams of an example piece of given content 210 and cropping the piece of given content to obtain the cropped content 212. The given piece of content 210 represents the content without cropping. The cropped content 212 represents the given content 210 with the content cropped out. In keeping with the previous example of FIG. 2B, the content between $L_{21}$-$L_{100}$ is cropped at the clip point $L_{20}$ to optimize the layout 212. Further, although FIG. 2C represents the given piece of content 210 and the cropped content 212 as a single pages, embodiments should not be limited as this was done for illustration purposes. For example, the given piece of content 210 may include one or multiple pages. In another embodiment, if the last page of a document has a different layout from at least one other page in the content, two different probabilities are determined as at modules 106-110 as in FIG. 1. For example, the last page of the document may have a different layout space than the middle page, as the last page may include layout space for possible advertisements. The probabilities for the last page and the middle page are calculated to determine where to crop content for the last page and the middle page.

FIG. 2D are block diagrams of example layouts 214 and 216 including pagination, arrangement of the content clipped in FIG. 2C, and the proportion of the content. The pagination is the division of the cropped content 212 over a given number of pages. The given number of pages is obtained from identifying the maximum probability as in FIGS. 2A-2C. The arrangement of the content is how to layout the cropped content 212 as identified from the maximum probability. The arrangement of the content takes into consideration the area of white space, margins, and/or other type of template parameters. The arrangement of the content in 214 is different from the arrangement of content in 216, since the arrangement of content 214 includes a header and three representative boxes for text. The arrangement of the content in 216 includes a box for text and a box for an image. The proportion of the content is the size of the content in the layout. Each of these design choices (i.e., pagination, arrangement, and proportion) are mutually dependent on each other as one design choice will affect the outcomes of the other design choices. In one embodiment, obtaining the value of the number of pages and the value of the length of the content as in FIGS. 2A-2C, the probabilities of each page based on a sequence of the design choices are determined to further optimize the layout of the pages. In this embodiment, a probability distribution is assigned to each possible sequence of variable design choices. The assigned probability may be assigned by a designer who may take into consideration the aesthetics, user demographics, etc. For example, the designer may assign a higher probability to choices of templates that may feature an image, prioritize certain content or whitespace proportions on the page more than others or prefer certain content paginations (where content fits the page) to others that may overflow or underflow the page.

Equation (2) evaluates the probability at each individual page based on a sequence of design choices at that particular page and aggregates these probabilities to determine the probability of the document over I number of pages. In equation (2), $T_i$ represents a possible choice of a template at a page number, which is considered a possible arrangement of the content. The possible proportions of the content at a given page is represented as $\theta_i$. The possible paginations of the content which divides the content into a discrete number of i pages is denoted by $C_{\leq i}$ which represents a possible allocation of content to the first i pages.

$$P(D,I)=\Pi_{i=1}^{I}P(C_{\leq i}|C_{\leq i-1},\theta_i,T_i)P(\theta_i|T_i)P(T_i) \quad (2)$$

Figure 3:
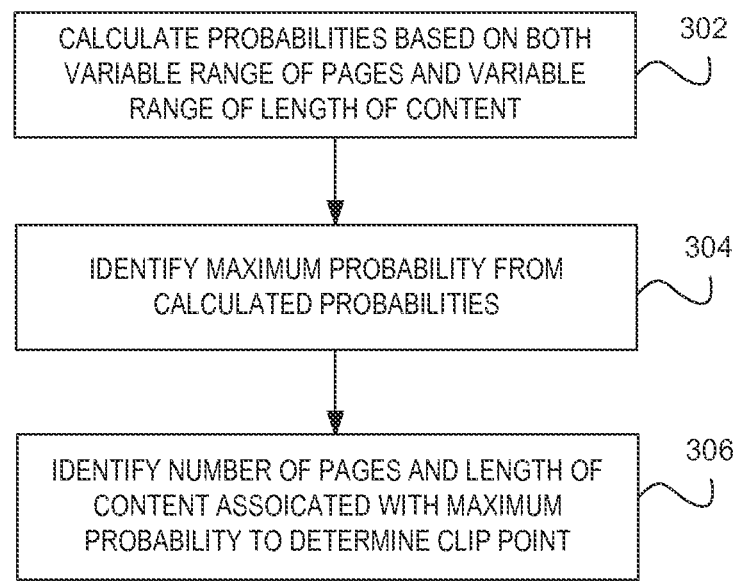
FIG. 3 is a flowchart of an example method to calculate probabilities, identify a maximum probability, and identify values for a number of pages and length of content associated with the maximum probability to determine a clip point to crop content in a layout.

FIG. 3 is a flowchart of an example method to calculate probabilities, identify a maximum probability, and identify values for the number of pages and length of content associated with the maximum probability to determine a clip point to crop content in a layout. In discussing FIG. 3, reference is made to FIGS. 2A-2D to provide contextual examples. Further, although FIG. 3 is described as implemented by a processor 104 as in FIG. 1, it may be executed on other suitable components. For example, FIG. 3 may be implemented in the form of executable instructions on a machine readable storage medium, such as machine-readable storage medium 504 as in FIG. 5.

At operation 302, the processor calculates the probabilities based on both a variable range of pages and variable range of length of content. In one embodiment, the probabilities as seen in the matrix 200 in FIG. 2A may be calculated as depicted in each intersection between a given number of pages and a given length of content. Each intersection is based on a given range of pages on a row and a given length of content as a column. Calculating the probabilities at operation 302 enables the processor to identify the maximum probability at operation 304. Operation 302 may be similar in functionality to module 106 as in FIG. 1.

At operation 304, the maximum probability is identified from the probabilities calculated at operation 302. The maximum probability, identified from the possible probabilities in the matrix 200, is the highest magnitude of the probabilities. Identifying the maximum probability, enables determining the values for the number of pages and the length of the content to provide an optimal layout. Operation 304 may be similar in functionality to module 108 as in FIG. 1.

At operation 306, the values for the number of pages and the length of content are identified from the maximum probability identified at operation 304. In one embodiment, the values for the number of pages and the length of content are identified from the matrix 200. These values are identified from the column and row by identifying the maximum probability. The values are utilized to crop the content and render the cropped content over the number of pages. Operation 306 may be similar in functionality to module 110 as in FIG. 1.

Figure 4:
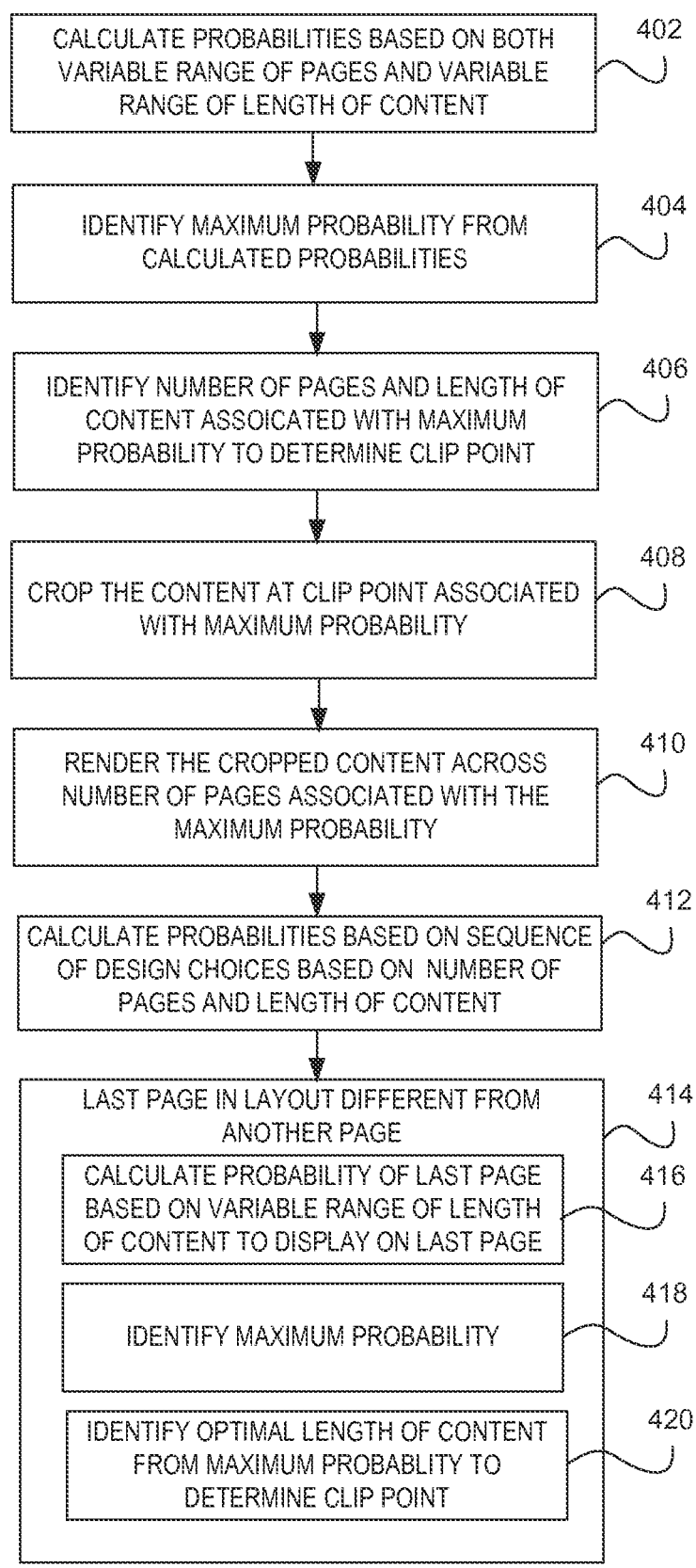
FIG. 4 is a flowchart of an example method to calculate probabilities, identify a maximum probability, and identify values of a number of pages and a length of content associated with the maximum probability to determine where to crop content in a layout, the example method further crops the content based on the length of the content, and renders the cropped content across the number of pages.

FIG. 4 is a flowchart of an example method to provide to calculate probabilities, identify a maximum probability, and identify values of a number of pages and a length of content associated with the maximum probability to determine where to crop content in a layout. In one embodiment, the method may crop the content based on the length of the content and render the cropped content across the number of pages. In a further embodiment, the method calculates probabilities based on a sequence of design choices. Yet, in another embodiment, the method may determine a last page in a layout is different from another page and identifies another probability. In discussing FIG. 4, reference is made to FIGS. 2A-2D to provide contextual examples. Further, although FIG. 4 is described as implemented by a processor 104 as in FIG. 1, it may be executed on other suitable components. For example, FIG. 4 may be implemented in the form of executable instructions on a machine readable storage medium, such as machine-readable storage medium 504 as in FIG. 5.

At operations 402-406, the method calculates probabilities based on both the variable range of pages and variable range of length of the content, identifies the maximum probability from the calculated probabilities, and identifies the values for the number of pages and the length of content associated with the maximum probability. In one embodiment, the method proceeds to operations 408-410 to crop the content at the clip point identified at operation 406 and render the cropped content. In another embodiment, the method proceeds from operations 402-406 to operation 412 for additionally calculating probabilities based on a sequence of design choices. In a further embodiment, the method proceeds from operations 402-406 to operations 414-420 if the last page of the layout is different from another page. Operations 402-406 may be similar in functionality to modules 106-110 and operations 302-306 in FIG. 1 and FIG. 3, respectively.

At operation 408, the content is cropped at the clip point based on the length of the content identified at operation 406. The content may be received by the processor which numbers the various lengths of the content to crop the content at the clip point.

At operation 410, the cropped content is rendered on the number of pages as identified at operation 406. Rendering the cropped content across the number of pages may include displaying the content to a user on an output device. In another embodiment, if the last page of the layout is different from another page, then the method proceeds to operation 414. This embodiment is useful when the content layout from the middle page is different than from the last page, thus the clip points of where to crop the content on these two pages may be different. For example, the middle page may include layout space for the content while the last page may include layout space for content continued from the middle page and extra space for a copyright notice and/or additional advertisements. In this example, the middle page may include more content than the last page, thus containing different content layouts.

At operation 412, probabilities of a sequence of design choices such as those identified in FIGS. 2C-2D are calculated. The probabilities are calculated using Equation (2) with the identified number of pages and the identified length of content. Calculating these probabilities further optimizes the layout for publishing the content.

At operation 414, if the last page of the layout has a different content layout than another page as explained at operation 410, the method performs operations 416-420. At operation 416, a probability of the last page based on a variable range of length of content of which is to be displayed on the last page. The probability calculated at operation 416 is different from the probabilities calculated at operations 402 or 412 as the probability at operation 416 considers a single page range (i.e., the last page). At operation 418, the maximum probability is identified. Identifying the maximum probability enables the content length for the last page to be identified at operation 420. At operation 420, the content is cropped as based on the length of content associated with the maximum probability.

Figure 5:
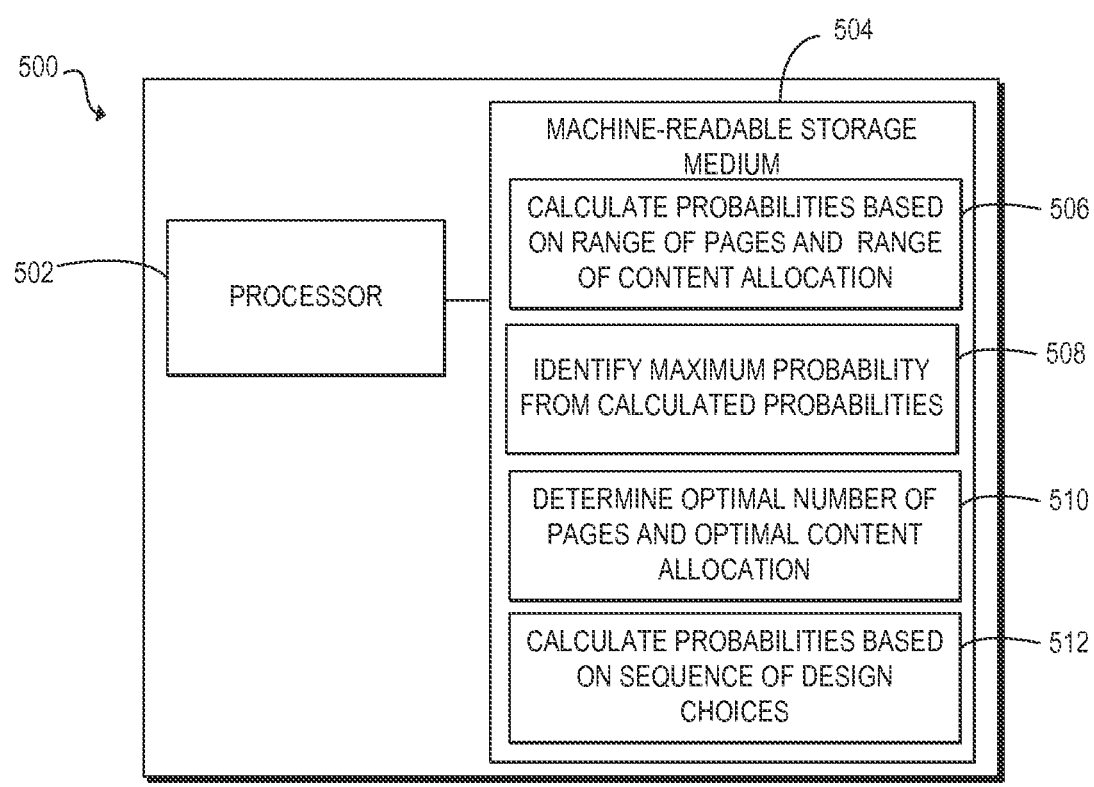
FIG. 5 is a block diagram of an example computing device with a processor to calculate probabilities based on a variable range of pages and a variable range of content allocation for identification of a maximum probability and to determine where to crop content based on an optimal number of pages and an optimal content allocation associated with the maximum probability.

FIG. 5 is a flowchart of an example computing device 500 with a processor 502 to execute instructions to execute instructions 506-512 within a machine-readable storage medium 504. Specifically, the computing device 500 with the processor 502 to calculate probabilities based on range of pages and range of content allocation for identification of a maximum probability. Based on the identification of the maximum probability, the optimal number of page and optimal content allocation is identified to determine where to crop content in a layout. Although the computing device 500 includes processor 502 and machine-readable storage medium 504, it may also include other components that would be suitable to one skilled in the art. The computing device 500 is an electronic device with the processor 502 capable of executing instructions 506-512, and as such embodiments of the computing device 500 include a computing device, mobile device, client device, personal computer, desktop computer, laptop, tablet, video game console, or other type of electronic device capable of executing instructions 506-512. For example, the computing device 500 may include the apparatus 102 as in FIG. 1.

The processor 502 may fetch, decode, and execute instructions 506-512 to determine where to crop content to optimize a layout. Specifically, the processor 502 executes: instructions 506 to calculate probabilities based on a variable range of pages and a variable range of content allocation on the layout; instructions 508 to identify a maximum probability from the probabilities calculated at instructions 506; instructions 510 to determine an optimal number of pages and optimal content allocation based on the maximum probability identified at instructions 508, the optimal number of pages and optimal content allocation enables determining where to crop content on the layout for optimization; and instructions 512 to calculate probabilities based on sequences of design choices to further optimize the layout. In one embodiment, the processor 502 may be similar in structure and functionality to the processor 104 as in FIG. 1 to execute instructions 506-512. In other embodiments, the processor 502 includes a controller, microchip, chipset, electronic circuit, microprocessor, semiconductor, microcontroller, central processing unit (CPU), graphics processing unit (GPU), visual processing unit (VPU), or other programmable device capable of executing instructions 506-512.

The machine-readable storage medium 504 includes instructions 506-512 for the processor to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, examples disclosed herein provide optimization of a layout by cropping content. Cropping the content provides a higher quality document as the context of the content is considered and/or aesthetic appearance.

I claim:

1. An apparatus comprising:
  a processor to:
    prepare a matrix having a plurality of elements organized over a plurality of rows corresponding to a variable range of pages and a plurality of columns corresponding to a variable range of length of content;
    at each element, determine a probability of a corresponding number of pages and a corresponding content length, each probability derived from a probability distribution and corresponding to a document quality score over the corresponding number of pages in content, the probability determined to optimize a layout of the document while maintaining a document context by filtering a plurality of clip points of the document to remove the clip points corresponding to truncations at which the document context is decreased, and by selecting a variable range of content length within a user-defined range of allowed content;
    identify a maximum probability from the determined probabilities;
    identify values for an optimal number of pages and an optimal length of the content associated with the maximum probability for determination of where to crop content in the layout; and
    render the document over the optimal number of pages and with the optimal length of the content.

2. The apparatus of claim 1 wherein the processor is further to:
  for each page of the optimal number of pages, calculate a probability for a sequence of design choices of the layout.

3. The apparatus of claim 2 wherein the design choices of the layout include pagination, arrangement of the content, and the proportion of the content.

4. The apparatus of claim 1 wherein the maximum probability is represented as a peak on a Gaussian curve.

5. A method, executed by a computing device, to determine a clip point to crop content for optimization of a layout, the method comprising:
- preparing a matrix having a plurality of elements organized over a plurality of rows corresponding to a variable range of pages and a plurality of columns corresponding to a variable range of length of content;
- at each element, determine a probability of a corresponding number of pages and a corresponding content length, each probability derived from a probability distribution and corresponding to a document quality score over the corresponding number of pages in content, the probability determined to optimize a layout of the document while maintaining a document context by filtering a plurality of clip points of the document to remove the clip points corresponding to truncations at which the document context is decreased, and by selecting a variable range of content length within a user-defined range of allowed content;
- identifying a maximum probability from the determined probabilities;
- identifying values for an optimal number of pages and an optimal length of the content associated with the maximum probability for determination to determine the clip points of the content for the layout; and
- rendering the document over the optimal number of pages and with the optimal length of the content.

6. The method of claim 5 further comprising:
- for each page of the optimal number of pages, calculating a probability based on a sequence of design choices of the layout.

7. The method of claim 6 further comprising:
- cropping the content at the clip point based on the length of the content associated with the maximum probability.

8. The method of claim 5 wherein the length of the content is measurable by one of the following: words, characters, lines of text, and paragraphs of text.

9. The method of claim 5 wherein the variable range of length of the content is measurable by one of the following: words, characters, lines of text, and paragraphs of text.

10. The method of claim 5 wherein if a last page in the layout includes a different arrangement of content from another page within the layout, the method is further comprising:
- calculating probabilities of the last page of the layout based on the variable range of length of the content to display on the last page; and
- identifying a maximum probability from the calculated probabilities based on the variable range of length of the content; and
- identifying an optimal length of the content from the maximum probability to determine the clip point of the content for the last page of the layout.

11. A non-transitory machine-readable storage medium encoded with instructions executable by a processor of a computing device, the storage medium comprising instructions to:
- prepare a matrix having a plurality of elements organized over a plurality of rows corresponding to a variable range of pages and a plurality of columns corresponding to a variable range of length of content;
- at each element, determine a probability of a corresponding number of pages and a corresponding content length, each probability derived from a probability distribution and corresponding to a document quality score over the corresponding number of pages in content, the probability determined to optimize a layout of the document while maintaining a document context by filtering a plurality of clip points of the document to remove the clip points corresponding to truncations at which the document context is decreased, and by selecting a variable range of content length within a user-defined range of allowed content;
- identify a maximum probability from the determined probabilities;
- identify values for an optimal number of pages and an optimal length of the content associated with the maximum probability for determination of where to crop content in the layout; and
- render the document over the optimal number of pages and with the optimal length of the content.

12. The non-transitory machine-readable storage medium of claim 11, further comprising instructions to:
- for each page of the optimal number of pages, calculate a probability based on a sequence of design choices including one of the following: pagination, arrangement of content, and proportion of content.

* * * * *